United States Patent
Albayrak et al.

(10) Patent No.: US 6,662,163 B1
(45) Date of Patent: Dec. 9, 2003

(54) SYSTEM AND METHOD FOR PROGRAMMING PORTABLE DEVICES FROM A REMOTE COMPUTER SYSTEM

(75) Inventors: Ray Albayrak, Dedham, MA (US); Sherri L. Meade, Montville, NJ (US); John D. Puterbaugh, Arlington, MA (US); Lee Stewart, Somerville, MA (US); Craig Vanderborgh, Boulder, CO (US); David C. Vetter, Cambridge, MA (US)

(73) Assignee: Voxware, Inc., Princeton, NJ (US)

(*) Notice: Subject to any disclaimer, the term of this patent is extended or adjusted under 35 U.S.C. 154(b) by 0 days.

(21) Appl. No.: 09/539,200

(22) Filed: Mar. 30, 2000

(51) Int. Cl.[7] .......................... G10L 13/00; G10L 15/00
(52) U.S. Cl. ................ 704/275; 704/260; 379/88.22
(58) Field of Search ..................... 704/260, 275, 704/270, 235, 246, 277, 243; 379/88.01, 88.17, 88.22, 93, 93.12

(56) References Cited

U.S. PATENT DOCUMENTS

| | | | | |
|---|---|---|---|---|
| 5,915,001 A | * | 6/1999 | Uppaluru .................. 379/88.22 |
| 5,924,068 A | * | 7/1999 | Richard et al. ............. 704/260 |
| 6,018,710 A | * | 1/2000 | Wynblatt et al. ............ 704/260 |
| 6,088,675 A | * | 7/2000 | MacKenty et al. ......... 704/270 |
| 6,157,705 A | * | 12/2000 | Perrone ................... 379/88.01 |
| 6,185,535 B1 | * | 2/2001 | Hedin et al. ............... 704/270 |
| 6,188,985 B1 | * | 2/2001 | Thrift et al. ............... 704/275 |
| 6,199,076 B1 | * | 3/2001 | Logan et al. ............... 707/501 |
| 6,246,672 B1 | * | 6/2001 | Lumelsky .................. 704/260 |
| 6,263,051 B1 | * | 7/2001 | Saylor et al. ............. 379/88.17 |
| 6,269,336 B1 | * | 7/2001 | Ladd et al. ................. 704/270 |
| 6,311,182 B1 | * | 10/2001 | Colbath et al. ................ 707/6 |

FOREIGN PATENT DOCUMENTS

GB          98/35491    *   8/1998  ................. 704/275

OTHER PUBLICATIONS

White, J "voice browsing" Jan.–Feb., 2000 IEEE vol. pp 55–56.*
Mohan, A "voice browsing for handheld device supporting WAP protocol" 2000 IEEE, pp 408–412.*

* cited by examiner

Primary Examiner—Daniel Abebe
(74) Attorney, Agent, or Firm—Gary S. Williams; Pennie & Edmonds LLP

(57) ABSTRACT

An interactive voice response system includes a server and a set of mobile clients. The server and clients include RF transceivers for exchanging messages over an RF channel. Each mobile client includes a microphone, a speaker or headset, a processor and a voice browser. The voice browser interprets voice pages received from the server. Upon receiving a particular voice page from the server, the voice browser outputs via the speaker voice prompts specified by the voice page. A speech recognition engine used by the voice browser converts voice responses from a user into a text response. The voice browser then performs an action based on the text response. The action taken may be to request a new voice page from the server, or to continue to interpret the current voice page.

6 Claims, 5 Drawing Sheets

SYSTEM AND METHOD FOR PROGRAMMING PORTABLE DEVICES FROM A REMOTE COMPUTER SYSTEM

The present invention relates generally to interactive voice response devices and more specifically to a method and system that use standard Internet protocols to send pages of information from remote computer systems to portable interactive voice response devices to program them to interact with and guide the actions of users.

BACKGROUND OF THE INVENTION

Many workers who perform tasks that would otherwise require close supervision can be guided efficiently through the use of portable interactive voice response devices. At the same time these devices can be used to collect data and verify the work done.

Consider, for example, the task of "picking," that is, retrieving, distinct sets of different items from a warehouse to fill customer orders. First the orders are collected and organized, next an efficient route through the warehouse is devised, then a warehouse worker is told what items to retrieve from specific locations to fill particular customer orders. The worker follows the prescribed route, picks the items, indicates any that are out of stock or that he cannot otherwise locate, segregates the items by customer order, and returns with the items. On other occasions a worker may follow a similar but different procedure to put away items, may receive items at a loading dock and verify shipping invoices, may inspect incoming or outgoing items, or may count and tabulate inventories.

For each of these tasks the worker could be given instructions verbally or on paper, and could record his results using paper and pencil. However, it is more efficient and reliable to use a portable computer-based device that provides the worker with step-by-step instructions as needed, that immediately requests verification or other data from him, and that transmits data to a remote computer system for storage in a central database. Typically, portable computer-based devices utilize a display screen for providing information and a keyboard for receiving information. However, in situations such as those described here the worker's eyes are busy looking at the items to be located, put away or counted, his hands are holding picked items, tools or a cart, and he may be wearing heavy gloves. Thus, it is not convenient for him to hold a computer-based device (e.g., a bar code scanner), view a display screen, or operate a keyboard. In these situations it is desirable for the worker to wear an interactive voice response device that provides instructions and verification in voice, and that accepts information in voice.

Portable computer-based devices, like other computer systems, must be programmed for particular functionality. Also, they must be sent specific data, for example, for specific customer orders. Furthermore, for convenience and flexibility, they should be programmed to support several kinds of tasks, and their programs should be changed or activated as required. Typically such devices are programmed for use in a particular facility or by a particular firm. However, it is more economical to produce commercially devices that can be easily programmed and reprogrammed. Thus, there is a need for methods and systems for easily programming, and for sending programs and data to portable interactive voice response devices so that they perform different functions as needed. There is also a need for general-purpose methods and systems for managing voice-oriented dialogs on such devices.

The ubiquitous World Wide Web Internet architecture provides well-known, standard means for displaying text and images, for playing sound recordings, and for receiving information from users. Graphical browsers such as MICROSOFT INTERNET EXPLORER and NETSCAPE COMMUNICATOR, which are widely used by the general public, interpret programs written in accordance with Internet programming conventions. Many convenient program development tools support those conventions. The simplest type of program is a set of linked pages written in the HTML (HyperText Markup Language) language. A page typically includes text style markers, text, references to files that store images or sound, and links to other pages. Means for representing and processing information are also becoming standard. In particular, the XML (extensible Markup Language) language represents information by storing markers that define the structure of the data together with the data itself. Software tools are available for creating, validating, displaying and extracting information from XML files. The World Wide Web was originally intended for access by general purpose computers, but many special-purpose devices, including wireless devices, have been developed to access it.

Over-the-telephone access to computer-based information is provided economically by interactive voice response systems. These systems provide information in voice, either using stored speech sequences or synthetic speech. They accept telephone key input. Some also use speech recognition to accept voice input. Interactive voice response systems are used for such applications as stock trading, order entry, and determining bank account balances and order status. Typically each manufacturer of such systems provides his own proprietary programming methodology and program development tools.

A consortium, called the VoiceXML Forum, founded by several large U.S. firms promotes using Internet-like programming conventions to standardize and facilitate the programming of interactive voice response systems. In particular, the VoiceXML Forum proposes the use of VoiceXML, an HTML-like eXtensible Markup Language that supports voice input and output with speech recognition and both stored and synthetic speech. To acquire and provide information, over-the-telephone users would use a voice browser that interprets VoiceXML programs similar to the way computer users use a graphical browser that interprets HTML programs. The VoiceXML Forum describes the use of VoiceXML and voice browsers only for over-the-telephone use, only with VoiceXML programs resident on a voice server, and only for acquiring and providing information. Prior to the present invention VoiceXML and voice browsers have not been used for other devices or applications. (Reference: "Voice Extensible Markup Language VoiceXML, Version 1.0", VoiceXML Forum, Aug. 17 1999, www.vxmlforum.org/specs_1.html)

The present invention uses Internet methodologies to meet the programming and reprogramming needs of portable interactive voice response devices. In particular, it integrates standard Internet protocols, the VoiceXML language and a voice browser to program and operate portable interactive voice response devices for the purpose of interacting with and guiding the actions of users. It thereby provides methods for creating voice-oriented Internet-based systems that support a multitude of applications, for example several different logistics applications within a warehouse, and that manage voice dialogs on portable devices, without requiring extensive computer programming for different facilities and applications.

SUMMARY OF THE INVENTION

An interactive voice response system includes a server and a set of mobile clients. The server and clients include RF transceivers for exchanging messages over an RF channel. Each mobile client includes a microphone, a speaker or headset, a processor and a voice browser. The voice browser interprets voice pages received from the server. Upon receiving a particular voice page from the server, the voice browser outputs via the speaker voice prompts specified by the voice page. A speech recognition engine used by the voice browser converts voice responses from a user into a text response. The voice browser then performs an action based on the text response. The action taken may be to request a new voice page from the server, or to continue to interpret the current voice page.

The server preferably includes an HTTP server module for receiving and responding to requests for voice pages from the mobile clients in accordance with a predefined protocol.

The mobile clients each include a text-to-speech module for converting text in a voice page into voice prompts, and a digitized speech module for playing digitized voice data representing other voice prompts. The mobile clients also include a speech recognition module for recognizing words or data string within a user's voice responses in accordance with a user specific voice file received from the server.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Overview of Invention

Figure 1:
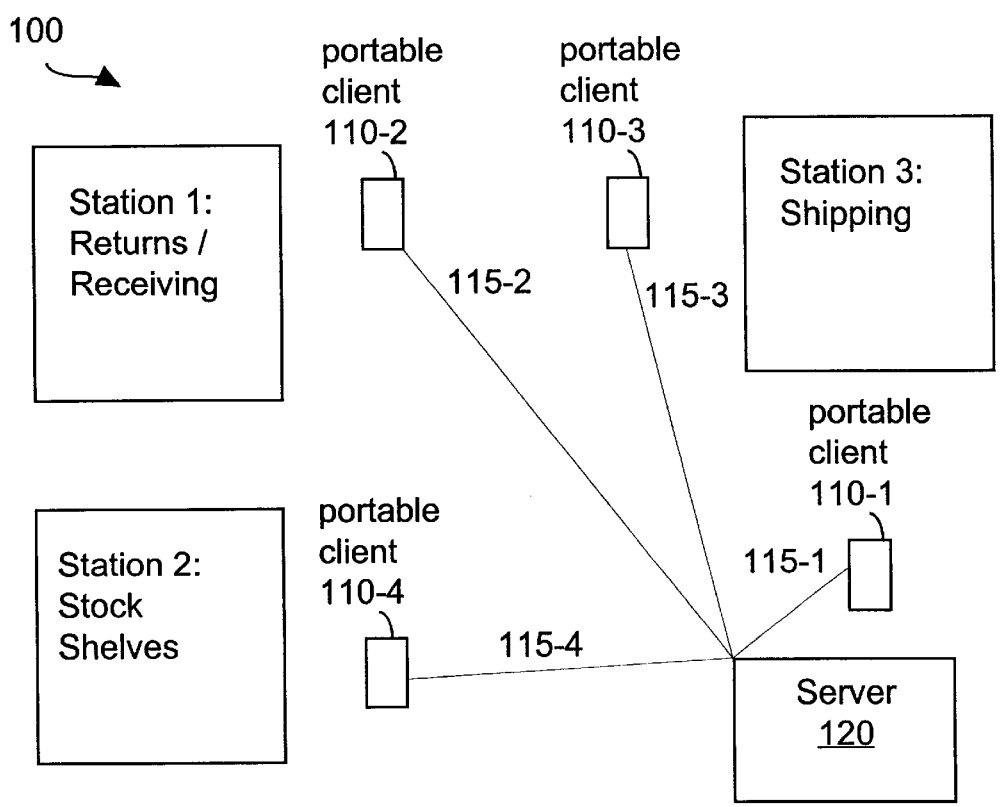
FIG. 1 illustrates a system in which portable clients communicate with a server.

The present invention utilizes standard Internet protocols to communicate between client and server computers, to dynamically program portable client computers, and to manage voice dialogs for the purpose of interacting with and guiding users in various work tasks. Generic communication protocols and software are integrated into a platform that supports a multitude of facilities and applications without requiring extensive computer programming. The software combines application-specific work procedures with data provided by third-party software such as existing Enterprise Resource Planning packages. This combination of procedures and data is used to control how the client interacts with the user, for example, what kind of input to expect from the user and when to expect it.

The present invention may be operated within a facility such as a warehouse, package distribution center, factory or inspection site. The client computer may be a wearable portable device that includes a CPU module, a voice browser application, battery pack, headphones and microphone. The server computer may be part of an Intranet network (that is, a local area network that runs Internet protocols) inside the facility. The client and server communicate via a Radio Frequency (RF) link. The server "serves" VoiceXML pages to voice browsers on portable clients within a facility using the same protocols that an Internet web (that is, World Wide Web) server uses to serve HTML pages to graphical browsers on computers.

A browser, in general, is a uniform hypertext interface to many kinds of information and application programs. Hypertext refers to a collection of computer-readable text documents containing links, that is, location references. A browser utilizes the links to facilitate moving its attention between linked documents. A voice browser is similar to a graphical browser in that it is a program that processes hypertext and presents the hypertext content in a specified format. The voice browser used in the preferred embodiment of this invention receives and outputs all information in the form of sound rather than having graphical input and output. The particular type of hypertext used in the preferred embodiment is based on VoiceXML. VoiceXML was designed by the VoiceXML Forum to create audio dialogs that feature digitized audio and speech recognition and to facilitate web-based development and content delivery. The voice browser reads a VoiceXML page from top to bottom and acts upon the information and instructions it reads as it reads them.

In a typical application the preferred embodiment works in the following manner:

Upon being powered up, the voice browser on the wearable portable client launches a default startup program on the server, by requesting a URL associated with that startup program.

The startup program (executed by the server) determines, from a database, information about the particular client, and sends a voice sign-on VoiceXML page to the voice browser thereby programming the client to perform the voice sign-on function.

The voice sign-on page prompts the user to say his or her name. If the name is recognized by the speech recognition software on the client, the user's voice files and application-specific grammar files (both needed for speech recognition) are loaded onto the client; otherwise this is a new user who must train the speech recognition software to understand his voice. The following assumes that the user's name is recognized.

When the voice browser reaches the end of the voice sign-on page it waits for the next program or page from the server, and in this case, a system host interface module is launched.

The system host interface module connects to the third-party software and waits to receive the task-specific data. Upon receiving the data, the system host interface module translates the data into a VoiceXML page and sends it to the voice browser thereby programming the client to perform the application.

The voice browser interprets the page and follows each instruction, for example, a) play an audio prompt telling the user to go to a particular location, b) wait for the user to verbally state his location, c) confirm that the user is in the correct location, d) play an audio prompt telling the user what to do at the current location, e) wait for the user to confirm that he completed the requested action, f) play another audio prompt if there is one, and continue.

When the voice browser gets to the bottom of the page, the final statement causes it to request the next program or page from the server, launch the appropriate system host interface module, and continue.

Server—Client System

Referring to FIG. 1, a web server 120 communicates over Radio Frequency (RF) links 115 with one or more portable clients 110 within a facility 100. The server 120 is part of a wireless local area network (WLAN) within the facility 100. In the preferred embodiment each RF link operates at a frequency of 2.4 GHz, but any suitable RF operating frequency may be used in other embodiments.

Although the invention is not limited to particular applications, the example facility 100 is a package distribution center where the portable clients 110 are engaged in a multitude of example applications including shipping, receiving, returns processing, inspection and picking. A client computer 122 may optionally be used for assisting in certain administrative tasks, such as training the speech recognition engine in the portable clients to recognize words spoken by each user of the portable clients.

Portable Client

Figure 2:
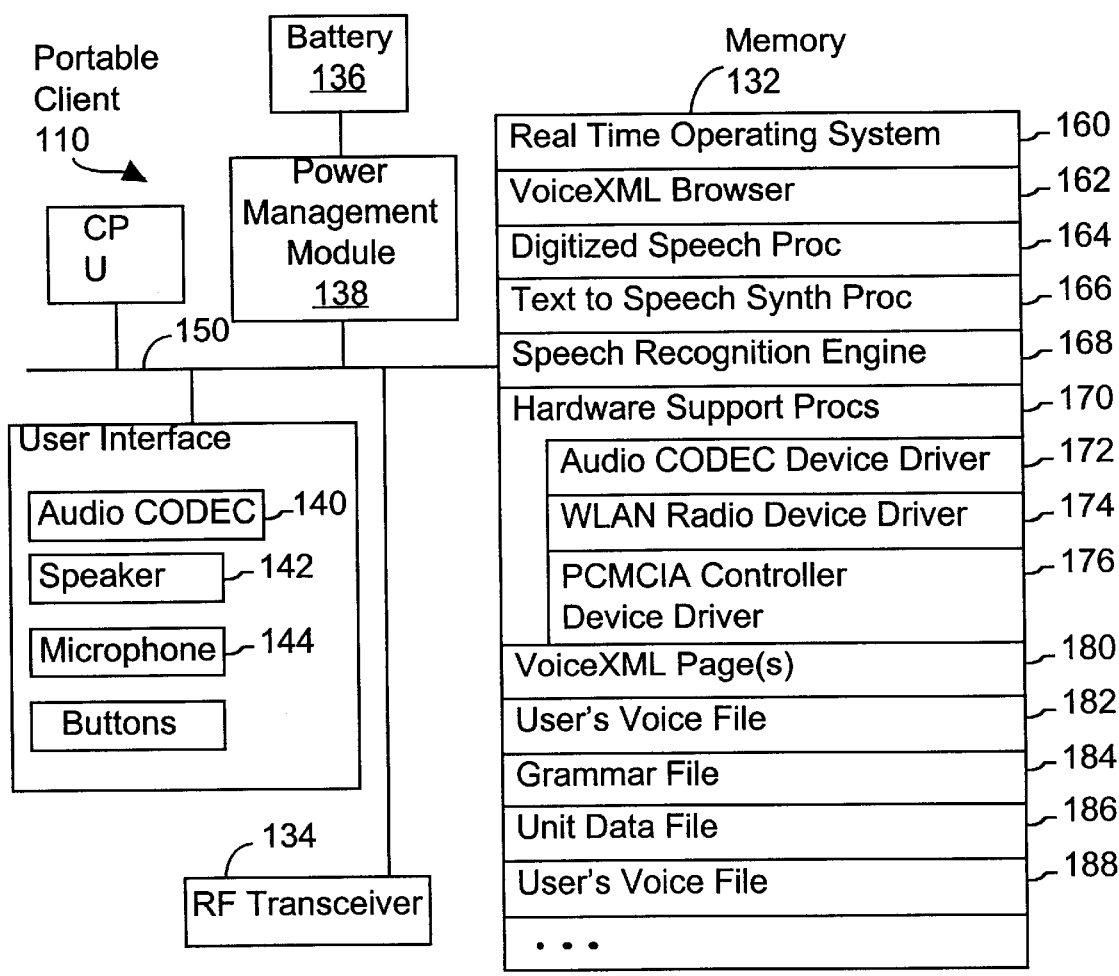
FIG. 2 is a block diagram of a portable client in an embodiment of the present invention.

As stated earlier, the portable clients are preferably small, wearable portable devices, typically weighing less two pounds or less, and being small enough to clip onto a user's belt or wear on a user's head as part of a headset. Referring to FIG. 2, a typical portable client 110 includes:

- a data processor (CPU) 130;
- memory 132, which may include random access memory and other storage media;
- a radio transmitter/receiver (RF transceiver) 134 for communications over RF links 115 (FIG. 1);
- an audio CODEC (COder-DECoder) 140, headphones or speaker(s) 142 and microphone 144 for audio input and output;
- a battery pack 146 with a power management module 148 for controlling the use of battery power by the client;
- and one or more buses 150 for interconnecting the aforementioned elements of the portable client 110.

The memory 132 of a portable client may store the following:

- a real time operating system 160;
- a voice browser 162;
- a digitized speech procedure 164 for converting digitized speech data into an audio signal conveying a voice prompt or other verbal message;
- a text-to-speech procedure 166 for converting text representing a prompt or message into an audio signal;
- a speech recognition engine or module 168;
- hardware support procedures 170, including: an audio CODEC device driver 172 for controlling the audio CODEC 140, a wireless local area network (WLAN) radio device driver 174, and a PCMCIA controller device driver 176 for supporting devices such as the RF transceiver 134;
- one or more VoiceXML pages 180, typically received from the server;
- a voice file 184, either generic or for a particular user, for use by the speech recognition engine 168; and
- a grammar file 184 for defining the sets of spoken words and phrases that are to be considered to be responsive to the voice prompts for an application; the grammar file 184 is typically defined by the application in the server that the user is working with;
- as well as other programs and data files not relevant to the present discussion.

In the preferred embodiment the operating system 160 is Wind River System's VxWorks Tornado Real-Time Operating System. The main functional component is a VoiceXML browser 162, which utilizes the speech recognition engine 168 to interpret users' verbal statements and the digitized speech and text-to-speech synthesis procedures 164, 166 to communicate information to users. The VoiceXML browser also communicates with and uses hardware support procedures 170 to operate the RF transceiver 134, microphone 144, headphones or speaker(s) 142 and battery pack 136.

In the preferred embodiment the speech recognition engine 168 is proprietary, noise-tolerant speech recognition software developed by Voxware, Inc. To ensure the highest possible recognition accuracy, recognition is speaker dependent, that is, each user must provide audio samples to train the speech recognition engine 168 to recognize his own speech. Also, what a user is expected to say at any particular point in a dialog, and what the speech recognition engine 168 can recognize at that point, is specified by grammars. A grammar is a set of statements that specify words and sentence syntax. For example, a grammar might specify that a user is expected to speak a particular number of digits, an affirmative or negative response including "yes," "no" and variants such as "yep" and "OK," or one of a predefined list of locations, perhaps with surrounding words.

The preferred embodiment provides voice prompts using digitized speech where practical, and otherwise uses text-to-speech synthesis. Digitized speech is used for instructions and responses that can be prepared ahead of time as sequences of prerecorded segments. Digitized speech compression technology supported by the preferred embodiment includes PCM, ADPCM and a proprietary low data rate technology developed by Voxware, Inc. Text-to-speech synthesis is used for speaking such things as uncommon customer and part names, which cannot be prepared easily ahead of time.

The preferred embodiment provides support for several different radios, including Proxim RangeLAN II, Lucent and Symbol.

Wireless Intranet

Figure 3:
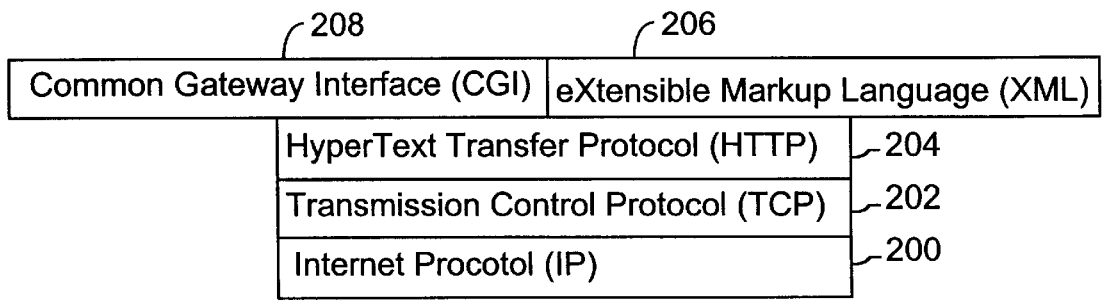
FIG. 3 is a block diagram of the relationships among Intranet protocols and interfaces.

Referring to FIG. 3, in a preferred embodiment the Intranet configuration consists of an HTTP web server that transmits XML-based documents over an internal wireless TCP/IP local area network. As depicted in FIG. 3, the Intranet builds upon the following well-known protocols and interfaces: Internet Protocol (IP) 200, Transmission Control Protocol (TCP) 202, HyperText Transfer Protocol (HTTP) 204, eXtensible Markup Language (XML) 206, and Common Gateway Interface (CGI) 208.

Internet Protocol 200 is a specific connectionless network protocol for routing and transferring packets of data between two computer systems. The protocol is "connectionless" in that, unlike a telephone network in which point-to-point connections are continuous and guaranteed during a telephone call, there is no fixed connection or path between the two end points during their communication of data. Rather, packets of data are routed through a network which may have many intervening computers and other devices, and different packets may be routed along different paths from one end point to the other.

Transmission Control Protocol 202 adds verification and retransmission to IP so that no data are lost during transmission. In general, when taken together, TCP/IP is a network protocol that facilitates data transmission and exchange. IP routes and transfers the data. TCP verifies that the data is received by the intended recipient, and otherwise resends it.

HyperText Transfer Protocol 204 is an application-level request/response protocol. It is the protocol of the World Wide Web, and it underlies all web browsers. HTTP provides a simple method for building systems that are independent of the particular type of data they transmit. HTTP is a protocol that aggregates TCP/IP packets of data to form complete documents. EXtensible Markup Language 206 is a markup-based language that provides a self-describing format for separating a document's content from its presentation. It does that through the insertion of content tags like <CustomerName> and <PartNumber> and presentation tags like <Center> and <Body BGColor="FFFFFF">. XML can be used as a universal data exchange format and thereby provides a cross-platform method of representing data.

Common Gateway Interface 208 is a mechanism for interfacing external applications with information servers, for example, for running programs from an HTTP server. A program that uses CGI is executed in real time, is invoked by the server, and can output information dynamically to a web browser. A CGI program is invoked when a client's browser requests the URL (Universal Resource Location) to which it corresponds. CGI operates on top of HTTP and therefore HTTP determines what can be sent via CGI.

Server

Figure 4:
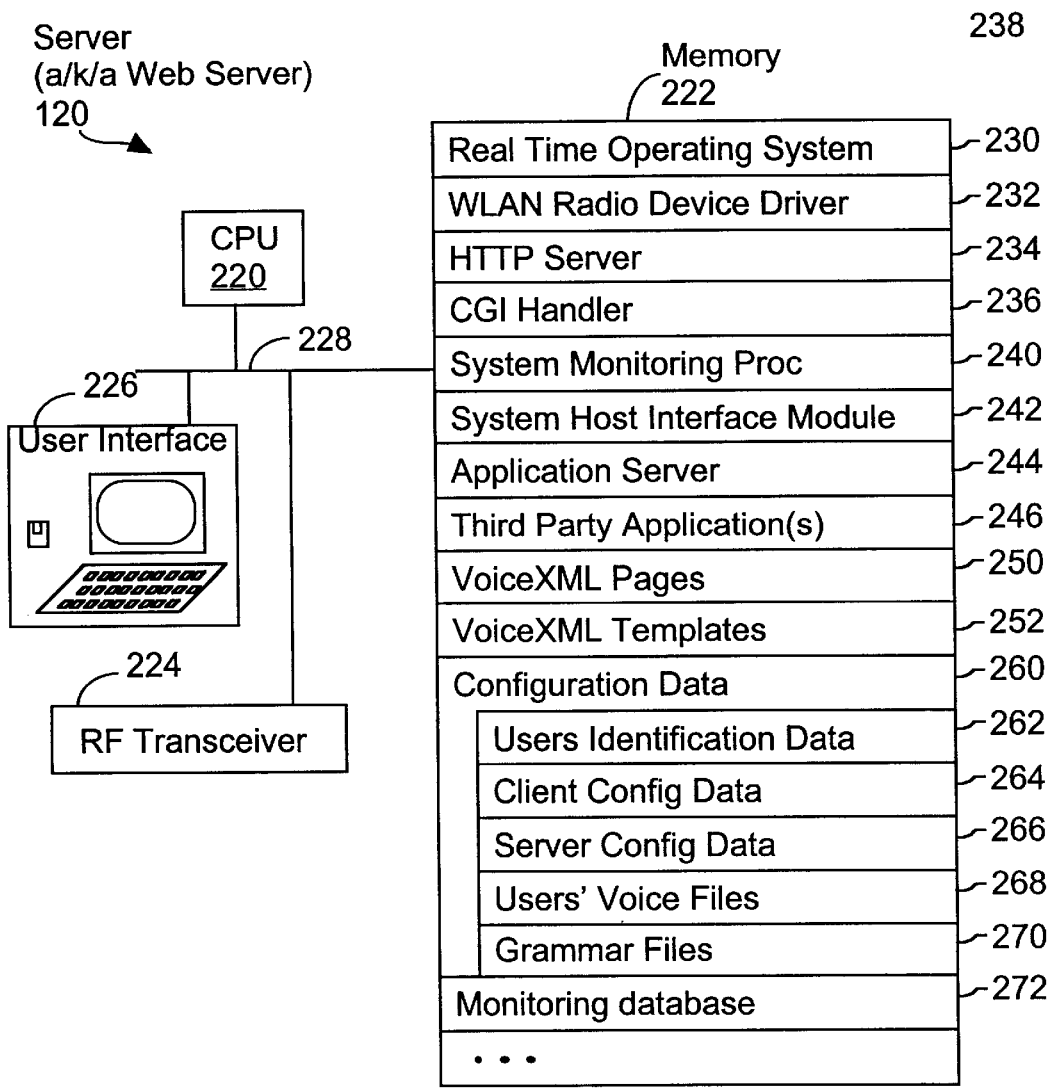
FIG. 4 is a block diagram of a server in an embodiment of the present invention.

Referring to FIG. 4, the Server, also called the Web Server 120, preferably includes:

- a data processor (CPU) 220;
- memory 222, which may include random access memory and other storage media;
- a radio transmitter/receiver 224 for communicating with the portable clients over RF links;
- a user interface 226; and
- one or more buses 228 for interconnecting the aforementioned elements of the server.

The server 120 may optionally be connected to another application server that executes an application, such as a warehouse management application, that controls the larger operation of an enterprise or the logistics for such an enterprise.

The memory 222 of the server 120 may store the following:

- an operating system 230;
- a WLAN radio device driver 232 for controlling use of the RF transceiver 224 for communicating with the portable clients;
- an HTTP server 234, for responding to http requests received from the portable clients;
- a CGI handler 236 for interpreting and responding to CGI scripts sent by portable clients and passed to the CGI handler 236 via the HTTP server 234;
- a system monitoring procedure 240 that stores information about speech recognition events, current network status, the portable device units currently connected to the network, and the current users, battery levels and wireless signal strengths of those units.
- a system host interface module (SHIM) 242 for connecting the CGI handler to a third party application server 244, which in turn executes a third party application 246;
- VoiceXML pages 250, some of which are pre-composed and others of which are generated by the SHIM 242 from one of a set of VoiceXML templates 252 and parameters received from the application 246;
- VoiceXML templates 252, each of which is a document written in the VoiceXML language that describes an application-specific verbal dialog between the portable client and its user; and
- system configuration data 260, including: user identification data 262 associated with the users of the portable clients; client configuration data 264 concerning the location, the battery state, the VoiceXML page currently loaded in the client, and so on; server configuration data 266 concerning the state of various resources and programs in the server; users' voice files 268 which are the files used by the speech recognition engines in the portable clients to recognize words spoken by the users; and grammar files 270, which are used by the VoiceXML browser in the clients to map words spoken by a user to a legal response expected by the application that is controlling the operation of the system (and to filter out words that are not included in any of the defined legal responses);
- a system monitoring database 272 for storing system status and monitoring data collected by the system monitoring procedure 240;
- as well as other programs and data files not relevant to the present discussion.

The third-party applications 246 may be a software package developed for use at a specific facility, or it may be a commercially available system such as one for Supply Chain Management (SCM), Enterprise Resource Planning (ERP) or Warehouse Management System (WMS). However, the present invention is not limited to these particular applications.

The configuration data 260 contain user information (e.g., the user's identification and gender), portable client unit information (e.g., the unit's identification, network address and status), the type of application in which the user is engaged (e.g., picking), the user's language preference (e.g., American English, Spanish or Japanese), and basic network-related information such as the server's IP address.

In the preferred embodiment configuration data files are stored as XML-based documents. For example, a typical user configuration file has the contents:

```
<?xml version="1.0"?>
<Config>
    <UserID>John</UserID>
    <Gender>male</Gender>
</Config>
``` where <?xml version="1.0"?> indicates that the data is coded in XML Version 1.0, <Config>and </Config> delimit configuration data, <UserID> and </UserID> delimit the user's identification, John is the value of the user's identification, <Gender> and </Gender> delimit the user's gender, and male is the value of the user's gender.

The System Host Interface Module (SHIM) 242 receives data from the third-party application 246 and converts it to a standard internal format. A different SHIM is required for every different type of third-party interface, including file import/export, sockets, API (application program interface) based interfaces, terminal emulation, and others. A socket is particular type of Internet communications API that supports TCP/IP.

The System Monitoring procedure 240 is a Java application on the web server 120 that stores information in the system monitoring database 272 about speech recognition events, current network status, the portable device units currently connected to the network, and the current users, battery levels and wireless signal strengths of those units. It receives data from any server component that is capable of connecting and sending data to it. System monitoring data is used for system monitoring, user performance (e.g., user picking rates) monitoring and diagnostics. The preferred embodiment receives data updates through the use of sockets.

Each VoiceXML template 252 is a document written in the VoiceXML language that describes an application-specific verbal dialog between the portable client and the user. A VoiceXML template differs from other VoiceXML documents in that it includes macros. For a particular situation and task, the SHIM provides values for the macro variables. Different templates provide dialog structures for different applications such as picking, returns processing and inspection.

Examples of macro definitions are:

```
#define MACRO_SERVER_HTTPIP "&server_httpip;"
#define MACRO_WMS_LOCATION "&wms_location;"
``` where the SHIM 242 would provide values for the parameters &server_httpip and &wms_location. The parameter &server_httpip refers to the IP address of the HTTP server 234, and the parameter &wms_location refers to the location where the user should go to pick the next set of items. For example, the values for the parameters &server_httpip and &wms_location might be 207.60.130.144 and 32456, respectively.

An example of a VoiceXML template is:

```
<?xml version="1.0"?>
<!DOCTYPE vxml SYSTEM "&file_dtd;">
<vxml application="http://&server_httpip/cgi_bin/Startup">
<block>
    <assign name = "LOCATION" expr="'&wms_location;'"/>
</block>
</vxml>
``` where, in addition to the macro parameters described above, &file_dtd refers to the Document Type Definition (DTD) file associated with the VoiceXML document for this application. The DTD file describes in a standardized way the VoiceXML document's hierarchy (e.g., UserID and Gender within the Config block), required tags (e.g., UserID and Gender) and any optional tags.

HTTP server 234 is a standard HTTP server.

CGI handler 236 is a group of application- and task-specific programs, including a Start CGI program and a Training CGI program, both of which are discussed below. A different program may be used for each different user task such as voice sign on, training speech recognition, picking, verification, and others.

In addition to their use in supporting the main application functions, in the preferred embodiment the software components shown in FIG. 4 are also used in support of administrative (e.g., network management) functions. The server software components together with a standard graphical browser and a standard desktop or laptop personal computer provide interactive pages that display and acquire administrative data. These pages, not depicted, provide access to configuration and system monitoring data, lead users through training of speech recognition software, and enable users to sign on to their clients manually.

A configuration page provides a user interface to Configuration data files 260. This page enables an administrator to add new users to the system, change information about wearable portable clients, and designate the type of application for each user.

A system monitoring page enables an administrator to examine the contents of the system monitoring database 272. It displays information about every portable client unit in the facility, including the client's battery and wireless signal strengths, and the productivity (for example, picking rate) of the client's user.

A training page provides a step-by-step real-time procedure for a new user to train the speech recognition software on his client. This enables the speech recognition software to (1) adapt to the particular noise conditions within a facility, (2) accommodate to the user's dialect, and (3) better recognize the words used for a particular application.

A manual sign-on page provides a simple method for logging on users at the start of each work day in case voice sign-on has not been installed.

The grammar files 270 each contain a set of syntax statements, collectively called a grammar, that are specific to a particular application. A grammar is represented by a set of syntax statements conceptually like:

```
    YesNoPhrase = {YesList} or {NoList}
and
    5DigitPhrase = {digit} {digit} {digit} {digit} {digit}
``` although the exact form of the syntax statements will vary from one embodiment to another. During execution of an application, if any legal phrase is recognized by the speech recognition engine of a portable client, the speech recognition engine returns the phrase name and the specific words or phrase (from which the words can be extracted); if no phrase is recognized in the words spoken by the user, that information is passed back to the application (running in or in conjunction with the server).

Programming the Client from the Server

Figure 5A:
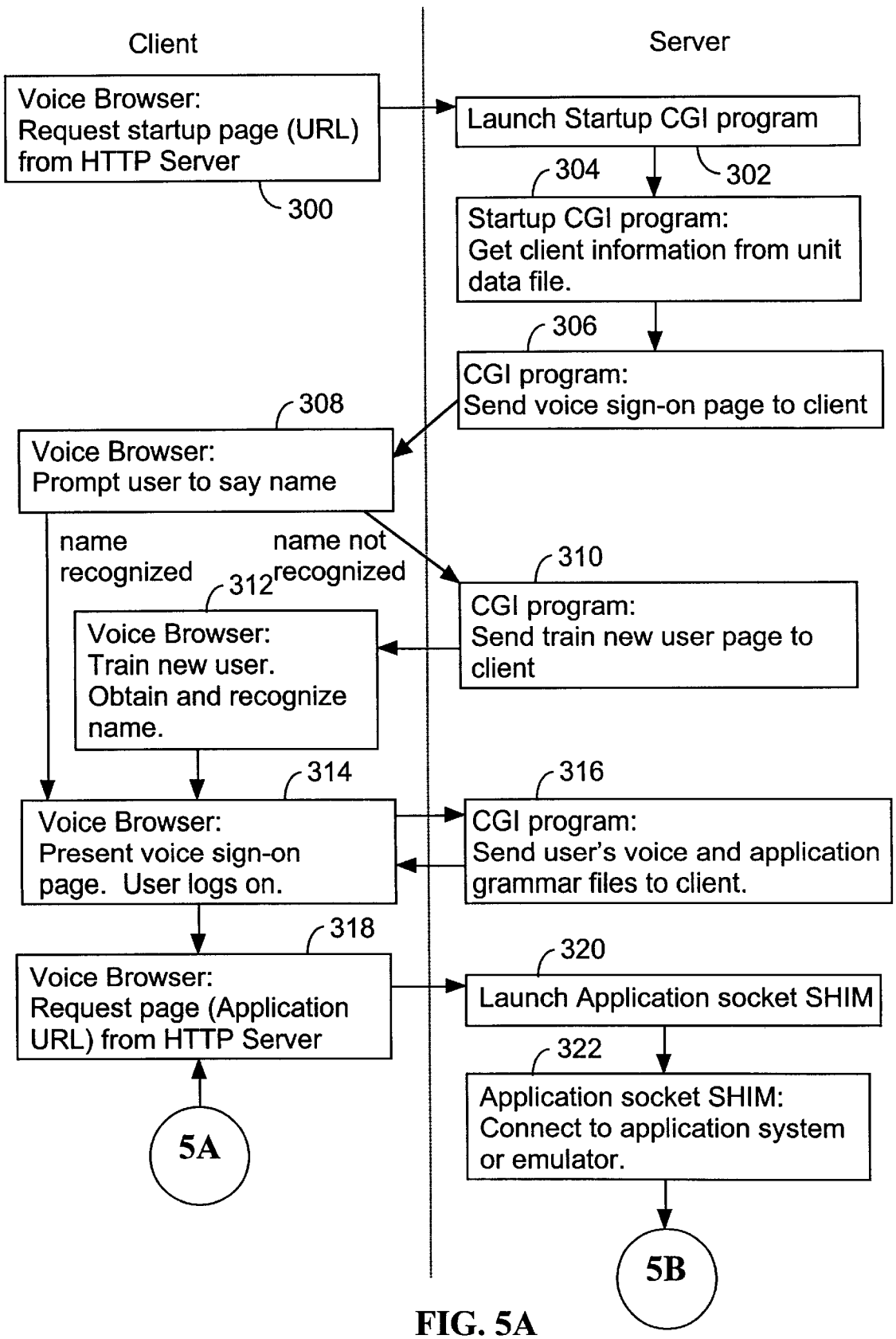
FIGS. 5A and 5B are a flowchart depicting operation of an embodiment of the present invention.
Figure 5B:
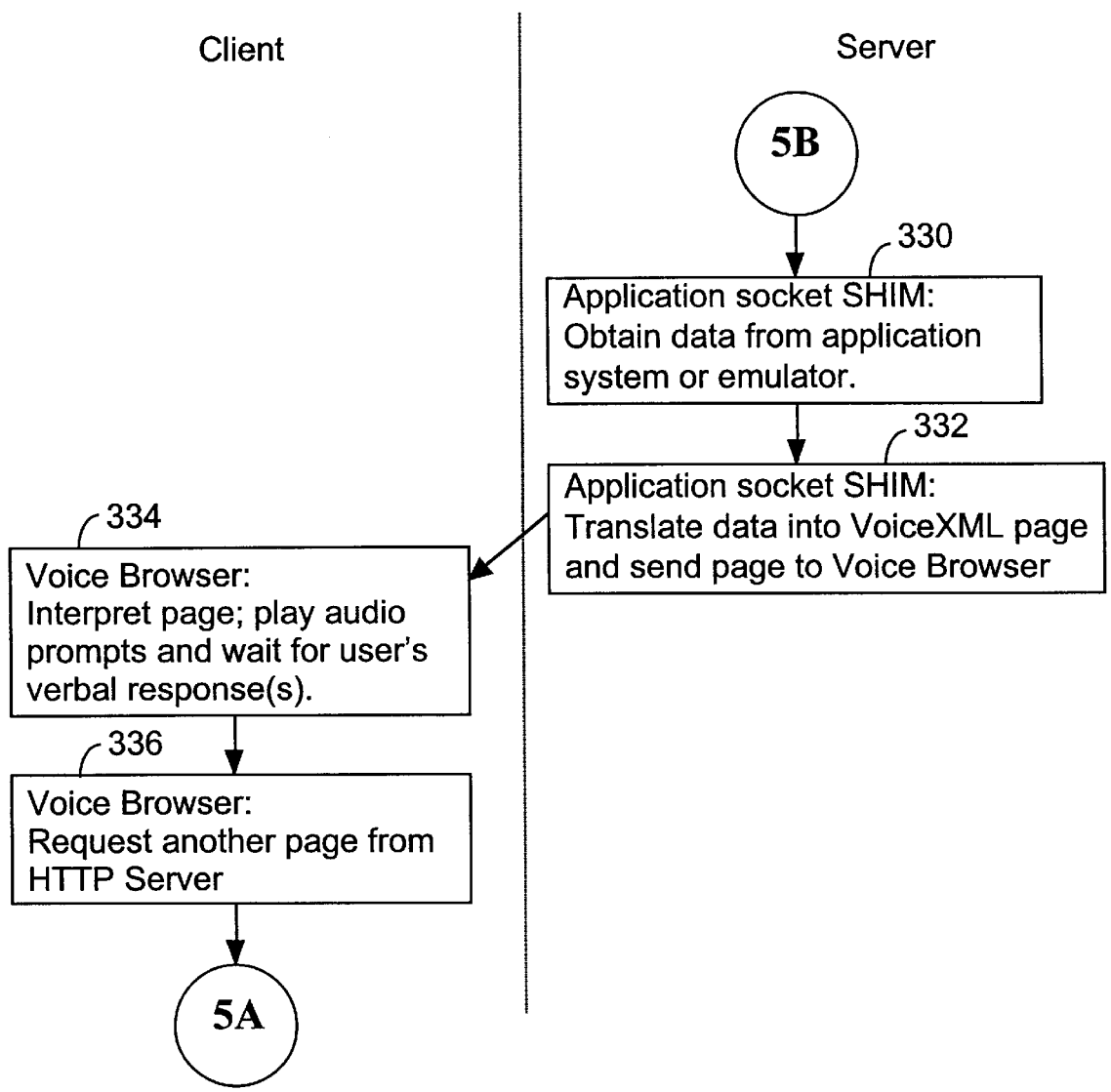

FIGS. 5A and 5B provide a flowchart that illustrates how the portable client is programmed for a typical application by sending it VoiceXML pages from the server. The flowchart refers to software components depicted in FIG. 4.

When a portable client unit is powered up, its VoiceXML voice browser requests a Startup URL from the HTTP server 234 on the main server computer 120 (300). In response, the HTTP server launches the Startup CGI program (302).

Next (304), the Startup CGI program retrieves the data file for the portable client unit from the configuration data (client configuration data 264, FIG. 4) to determine information, e.g., current application, status and battery condition, about the particular client unit that requested the startup program. Also, the Startup CGI program sends a voice Sign-On VoiceXML page to the client's voice browser (306).

In accordance with instructions in the VoiceXML page, the client uses audio output and speech recognition software to prompt the user to say his or her name (308), and to attempt to recognize the user's response. If the speech recognition software successfully recognizes the user's name, the voice browser continues to read the VoiceXML page and executes instructions that cause the user's voice and application grammar files to be loaded onto the client (314, 316). If the speech recognition software is not able to recognize the user's name, the Training CGI program is launched (310), a New User application page is sent to the portable client (310), and the voice browser in the client prompts the user to train the speech recognition software to recognize his or her voice (312).

By following VoiceXML instructions in the voice Sign-On page, the voice browser continues the verbal dialog with the user until he is positively identified and logged onto the system (314). At that point, the voice browser is at the bottom of the voice Sign-On page.

To program the portable client for the application, the voice browser requests the Application URL from the HTTP server (318). In response (320), the HTTP server launches the Application Socket SHIM. In practice a different Application Socket SHIM is provided for each distinct application such as Warehouse Management System, Supply Chain Management, or Enterprise Resource Planning.

The Application Socket SHIM connects to the application server (322) and waits to receive application- and task-specific data from it (330). This data is specific to both the application and the specific task at hand, for example, picking up goods to fill specific customer orders. Upon receiving the data, the Application Socket SHIM inserts the data into the Application VoiceXML template and sends the resulting Application VoiceXML page to the voice browser (332).

The voice browser reads the Application page, and follows its instructions to carry on the application-specific dialog with the user (334). Generally, the wearable portable client plays an audio prompt, the user responds verbally, the client recognizes his response, and this interaction continues until the voice browser reaches the bottom of the Application VoiceXML page.

For example, if the application server runs a Warehouse Management System program and the user is picking packages within a warehouse, the portable client would be programmed by the application VoiceXML page to perform a sequence of actions similar to:

play an audio prompt telling the user to go to a particular location;

wait for the user to speak a check string corresponding to his location;

confirm that the user is at the correct location;

play an audio prompt telling the user how many items to pick at the current location; and wait for the user to confirm the number of items picked, and continue until this task is complete.

When the voice browser gets to the bottom of the Application page, it requests another URL from the HTTP server (336) using a standard HTTP request. This process continues (318–336) until the portable client is powered down. The URL requested at the bottom of the application voice page depends on the application. Typically, it is the URL for the application socket SHIM, which either sends additional application voice pages or terminates the application.

The Training CGI program, which supports a user training the speech recognition software to recognize his speech, is similar to many other CGI programs. In the preferred embodiment, in addition to using the portable client with its voice browser, training also requires a client computer 122 (FIG. 1), typically a laptop personal computer, with a conventional graphical browser. The client computer enables a new user to communicate before the speech recognition software is able to recognize his speech.

Training starts when the Training CGI program is explicitly selected by the user from the Training Web page displayed on the client computer. Two actions are performed as a result of launching the Training CGI program. One action launches a Training Graphical User Interface implemented as a Java applet within the client computer's graphical browser. The other action sends a Training VoiceXML page to the portable client's voice browser.

The voice browser launches a training Java applet on the portable client that establishes a socket connection with its peer, the training Java applet on the client computer. Once a connection has been established between the two training Java applets, the user sees training prompts appear on his client computer's graphical browser.

In the preferred embodiment, training proceeds in the following manner:

1) A phrase, e.g., "item 39485" is displayed on the graphical browser of the client computer.
2) The user speaks this phrase into a microphone attached to a portable client 110.
3) The recognition result, that is, the words recognized by the speech recognition software, is displayed on the client computer's graphical browser.
4) If the recognition result matches the displayed phrase, the next phrase is displayed. Otherwise, the user selects between two buttons displayed on the graphical browser. One button indicates that the user said the phrase correctly, but the recognition result is wrong. The other button indicates that the user may have said the phrase incorrectly and wishes to say it again.
5) Steps 1 through 4 are repeated until the voice browser terminates training, either because recognition is sufficiently accurate as a result of training, or because this new user does not speak clearly or consistently enough to use speech recognition.

Alternate Embodiments

The present invention can be implemented as a computer program product that includes a computer program mechanism embedded in a computer readable storage medium. For instance, the computer program product could contain the program modules shown in FIGS. 2, 3, 4 and 5A–5B. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of exchanging information with a plurality of mobile users, comprising:

exchanging messages between a server and a plurality of mobile client units, using wireless RF transmissions, each mobile client unit being used by a respective one of the mobile users;

at each mobile client unit: receiving from the server a respective first voice page, and interpreting the respective first voice page by: speaking via a speaker voice prompts specified by the respective first voice page, receiving and converting voice responses from the user of the mobile client unit into text responses, and performing an action based on at least one of the text responses;

wherein the action performed is selected from the set consisting of requesting a new voice page from the server and continuing to interpret the respective first voice page;

the server executes a warehouse management application that generates application data in response to a request from any one of the mobile client units, and executes an interface module that converts the application data into the new voice page; and executing the warehouse management application generates one or more voice pages that cause the one mobile client unit to perform the steps of:

playing an audio prompt-telling a user to go to a specified location;

waiting for the user to speak a check string corresponding to the specified location, thereby confirming the user is at the specified location;

playing an audio prompt instructing the user to perform a task;

waiting for the user to confirm the task is completed; and repeating the telling, first waiting, playing and second waiting steps.

2. A method of exchanging information with a plurality of mobile users, comprising:

exchanging messages between a server and a plurality of mobile client units, using wireless RF transmissions, each mobile client unit being used by a respective one of the mobile users;

at each mobile client unit: receiving from the server a respective first voice page, and interpreting the respective first voice page by; speaking via a speaker voice prompts specified by the respective first voice page, receiving and converting voice responses from the user of the mobile client unit into text responses, and performing an action based on at least one of the text responses;

wherein the action performed is selected from the set consisting of requesting a new voice page from the server and continuing to interpret the respective first voice page;

the server executes a manufacturing management application that generates manufacturing application data in response to a request from any one of the mobile client units, and executes an interface module that converts the manufacturing application data into the new voice page; and executing the manufacturing application generates one or more voice pages that cause the one mobile client unit to perform the steps of:

playing an audio prompt telling a user to go to a specified location;

waiting for the user to speak a check string corresponding to the specified location, thereby confirming the user is at the specified location;

playing an audio prompt instructing the user to perform a task;

waiting for the user to confirm the task is completed; and repeating the telling, first waiting, playing and second waiting steps.

3. A method of exchanging information with a plurality of mobile users, comprising:

exchanging messages between a server and a plurality of mobile client units, using wireless RF transmissions, each mobile client unit being used by a respective one of the mobile users;

at each mobile client unit: receiving from the server a respective first voice page, and interpreting the respective first voice page by: speaking via a speaker voice prompts specified by the respective first voice page, receiving and converting voice responses from the user of the mobile client unit into text responses, and performing an action based on at least one of the text responses;

wherein the action performed is selected from the set consisting of requesting a new voice page from the server and continuing to interpret the respective first voice page;

the server executes an application that generates data in response to a request from any one of the mobile client units, and executes an interface module that converts the data into the new voice page; and executing the application generates one or more voice pages that cause the one mobile client unit to perform the steps of:

playing an audio prompt instructing the user to perform a task;

waiting for the user to confirm the task is completed; and repeating the playing and waiting steps.

4. An interactive voice response system, comprising:

a server having an RF transceiver; and a plurality of mobile client units having RF transceivers for exchanging messages with the server, each mobile client unit including a microphone, a speaker, a processor, and a voice browser; the voice browser for interpreting a first voice page received from the server, speaking via the speaker voice prompts specified by the first voice page, converting voice responses from a user into a text response and performing an action based on the text response;

wherein the action performed is selected from the set consisting of requesting a new voice page from the server and continuing to interpret the first voice page;

the server is configured to execute a warehouse management application that generates application data in response to a request from any one of the mobile client units, and to execute an interface module that converts the application data into the new voice page; and the warehouse management application includes instructions for generating one or more voice pages that cause a mobile client unit of the plurality of mobile client units to perform the steps of:

playing an audio prompt telling the user to go to a specified location;

waiting for the user to speak a check string corresponding to the specified location, thereby confirming the user is at the specified location;

playing an audio prompt instructing the user to perform a task;

wait for the user to confirm the task is completed; and repeating the telling, first waiting, playing and second waiting steps.

5. An interactive voice response system, comprising:

a server having an RF transceiver; and a plurality of mobile client units having RF transceivers for exchanging messages with the server, each mobile client unit including a microphone, a speaker, a processor, and a voice browser; the voice browser for interpreting a first voice page received from the server, speaking via the speaker voice prompts specified by the first voice page, converting voice responses from a user into a text response and performing an action based on the text response;

wherein the action performed is selected from the set consisting of requesting a new voice page from the server and continuing to interpret the first voice page;

the server is configured to execute a manufacturing management application that generates manufacturing application data in response to a request from any one of the mobile client units, and to execute an interface module that converts the manufacturing application data into the new voice page; and the manufacturing application includes instructions for generating one or more voice pages that cause a mobile client unit of the plurality of mobile client units to perform the steps of:

playing an audio prompt telling the user to go to a specified location;

waiting for the user to speak a check string corresponding to the specified location, thereby confirming the user is at the specified location;

playing an audio prompt instructing the user to perform a task;

wait for the user to confirm the task is completed; and repeating the telling, first waiting, playing and second waiting steps.

6. An interactive voice response system, comprising:

a server having an RF transceiver: and a plurality of mobile client units having RF transceivers for exchanging messages with the server, each mobile client unit including a microphone, a speaker, a processor, and a voice browser; the voice browser for interpreting a first voice page received from the server, speaking via the speaker voice prompts specified by the first voice page, converting voice responses from a user into a text response and performing an action based on the text response;

wherein the action performed is selected from the set consisting of requesting a new voice page from the server and continuing to interpret the first voice page;

the server is configured to execute an application that generates data in response to a request from any one of the mobile client units, and to execute an interface module that converts the data into the new voice page; and the application includes instructions for generating one or more voice pages that cause a mobile client unit of the plurality of mobile client units to perform the steps of:

playing an audio prompt instructing a user of the mobile client unit to perform a task;

wait for the user to confirm the task is completed; and repeating the playing and waiting steps.

* * * * *